United States Patent [19]

Heuer et al.

[11] 4,343,507
[45] Aug. 10, 1982

[54] MOUNTING ARRANGEMENT FOR A VENTILATION OR HEATING SYSTEM FOR VEHICLES

[75] Inventors: Wolfgang Heuer, Düsseldorf; Wilhelm Gerhardinger, Dormagen, both of Fed. Rep. of Germany

[73] Assignee: Duewag Aktiengesellschaft, Krefeld, Fed. Rep. of Germany

[21] Appl. No.: 157,648

[22] Filed: Jun. 6, 1980

[30] Foreign Application Priority Data

Jun. 7, 1979 [DE] Fed. Rep. of Germany ....... 2923086

[51] Int. Cl.³ .............................................. B62D 25/00
[52] U.S. Cl. .................................... 296/208; 98/2.05; 98/2.08; 52/287; 105/401
[58] Field of Search ............... 296/178, 191, 192, 199, 296/208; 49/463, 464, 465, 466; 52/287; 98/2, 2.05, 2.08, 2.14, 2.15, 2.06, 2.07; 105/396, 397, 400, 401, 423

[56] References Cited

U.S. PATENT DOCUMENTS

| 2,250,523 | 7/1941 | Christiansen | 105/401 |
| 2,482,906 | 9/1949 | Goodwin | 296/191 |
| 3,035,161 | 5/1962 | Kalt | 105/397 X |
| 3,455,595 | 7/1969 | Wessells | 98/2.08 X |

Primary Examiner—Robert R. Song
Attorney, Agent, or Firm—Michael J. Striker

[57] ABSTRACT

A mounting arrangement for a ventilation or heating system for passenger vehicles having an air duct located in the interior of the vehicle includes an angularly-shaped profile enclosing the air duct. The profile has an upper end portion secured to a clamping device connected to the side wall of the vehicle and a lower end portion which is positioned within a support element formed of an elastic yieldable material having a pair of projecting lips forming a space therebetween to receive the end of the lower end portion and extended to engage this end portion upon insertion therebetween.

7 Claims, 1 Drawing Figure

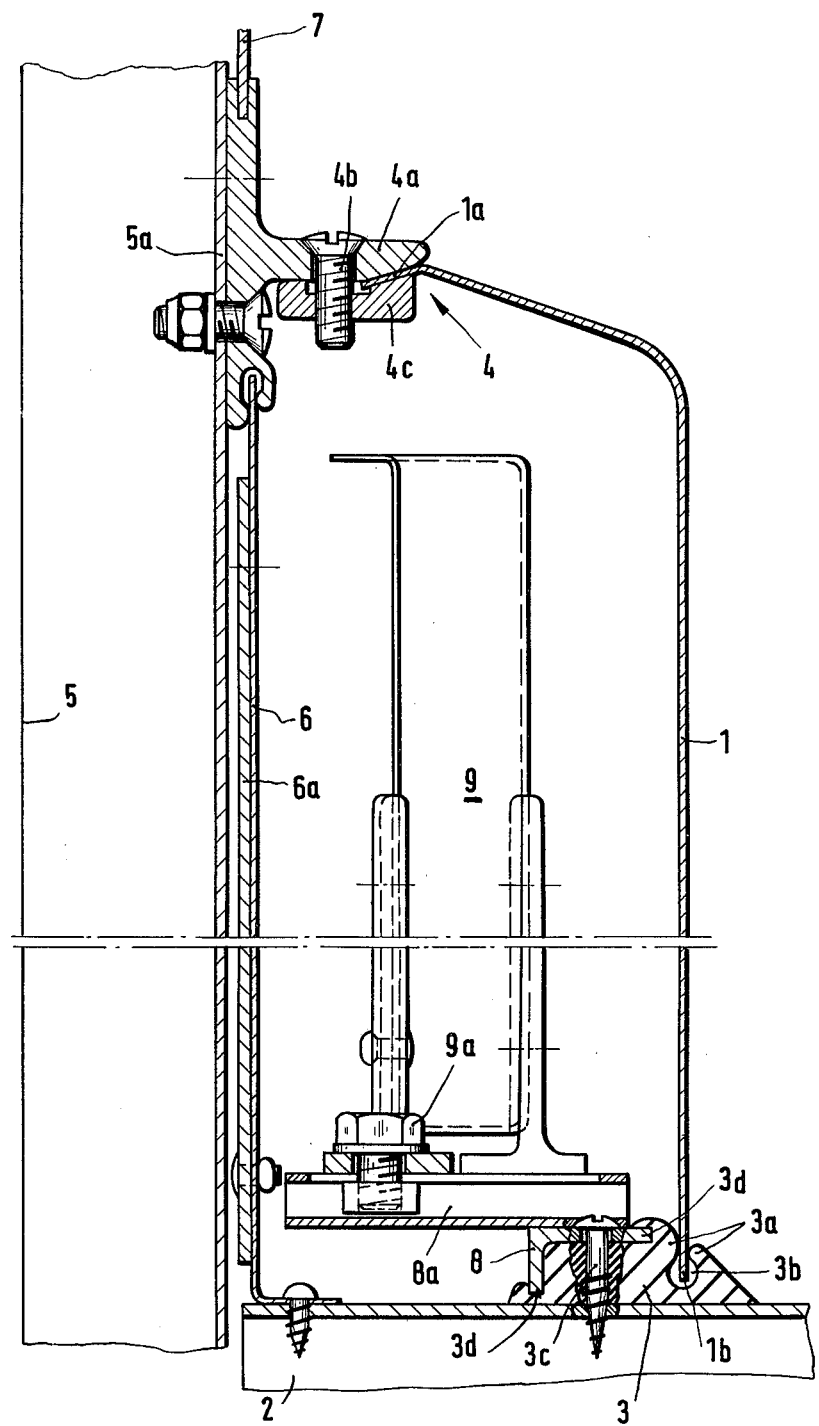

4,343,507

MOUNTING ARRANGEMENT FOR A VENTILATION OR HEATING SYSTEM FOR VEHICLES

BACKGROUND OF THE INVENTION

The present invention relates generally to ventilation or heating systems of the passenger vehicles such as cars or buses or the like. More particularly the invention relates to a mounting arrangement for air ducts of the ventilation or heating system which are located within the interior of the passenger vehicle.

In the known arrangements an air duct is bounded by a profile of an angularly shaped cross-section which may be made from a sheet metal or from a synthetic material reinforced with filaments or fibers. Such a profile is mounted within the vehicle so that it is secured to the floor of the vehicle with one end thereof and affixed to the side wall of the vehicle with another end.

This structure is known and used as for example, in the subway car constructions "U2 Frankfurt". The known arrangements include an angularly shaped profile of a sheet metal bounding the air duct and having the ends secured to the floor and to the side wall of the vehicle. One end is affixed to the floor of the vehicle by means of a metal bar. This bar is formed as a U-shaped element having a gap to receive the end of the metal profile. In order to reduce the gap rubber inserts are installed into the U-shaped bar. The other end of the profile is secured to the side wall by means of a number of screws fastened to a supporting element connected to the side wall. One of the problems with this known arrangement is that the latter includes a substantially large number of connecting elements used in the assembly which is disadvantageous particularly since the profiles covering the cooling baffles require a precise installation and wherein relatively frequent mountings and dismountings of these profiles are thus undesirable. Furthermore, in the arrangements of the known type, it is rather difficult to maintain the clean conditions for the air-ducts especially in the connections of the profile with the vehicle floor.

SUMMARY OF THE INVENTION

Accordingly, it is an object of the invention to overcome the disadvantages of the prior art.

More particularly, it is an object of the invention to provide an improved mounting arrangement for a ventilation or heating system for passenger vehicles. Another object is to provide such a mounting arrangement which is rather inexpensive and provides for maintaining clean conditions for the air ducts during the operation of the ventilation system.

These and other objects of the invention are attained by a mounting arrangement for a ventilation system of the vehicle having an air duct located within the interior of the vehicle, this mounting arrangement comprises an enclosure bounding an air duct and including a profile of an angularly-formed cross-section having a first end portion and a second end portion. A support means to support the first end portion is provided in the arrangement which is secured to the floor of the vehicle and formed of an elastic synthetic material such as rubber arranged to engage the first end portion upon insertion thereof into the support means. A clamping means arranged to secure the second end portion of the profile is connected to the side wall of the vehicle.

The profile may be made from a sheet metal.

Alternately, this profile may be formed of a synthetic material reinforced with a fiber.

In order to avoid bending of the angularly-shaped profile during its attachment to the side wall of the vehicle which is normally vertical, the second end portion of the profile is inclined toward the floor of the vehicle so that the line of its inclination is tangent to a circumference having a center point at the end of the first end portion and the clamping means include a gap to engage the second end portion; this gap is inclined in the direction corresponding to that of the second end portion.

In order to avoid tilting deformations of the elastic support means these means include a pair of projecting lips forming a free space therebetween, the first end portion is tended into this space and engaged by the projecting lips.

The clamping means may include a first connecting element formed with a laterally extended web and a second connecting element, the web of the first connecting element and the second connecting element in assembly form a gap for the second end portion. The first connecting element with a web may be formed as an integral portion of the side wall which in this case includes an extrusion profile. In this event the extrusion profile provides additional contact surfaces for the air duct which are located behind and above the air duct.

The construction of the mounting arrangement in accordance with the invention provides a reliable securing means for the angularly-formed profile. The assembly and disassembly of these profiles may be carried out in a simple manner so that an easy access to the construction elements inside of the air ducts may be approached. Furthermore, the clean maintainance of the vehicle in connections of the profile with the floor of the vehicle may be easily achieved.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The sole FIGURE of the drawing is a partially sectioned view showing structural parts of an assembly in accordance with the present invention.

DETAILED DESCRIPTION OF THE PREFERRED EMBODIMENT

A mounting arrangement for an air duct having guide baffles and denoted as 9 includes an angularly-shaped profile 1 which serves as an enclosure to cover an air duct of a ventilation or heating system arranged within the interior of a passenger vehicle. The passenger vehicle is shown in the FIGURE as having a floor 2 and a side wall designated by reference numeral 5. The profile 1 may be made from a sheet metal or from a synthetic material reinforced with fibers or filaments. The profile 1 includes a substantially vertical wall terminated with a first end portion 1b and a sloped upper wall terminated with an inclined second end portion 1a. The first end portion 1b is secured to the floor 2 of the vehicle by means of an elastic support element 3 which may be formed of an elastically yieldable material, preferably rubber. The deformable rubber material engages the first end portion 1b with two upwardly projecting lips 3a which are constructed so as to form a free space 3b therebetween. The first end portion 1b inserted into this space is firmly engaged with the projecting lips 3a and is thus reliably secured to the vehicle floor along the entire length of air duct. The elastic support element 3 is fastened to the vehicle floor 2 by means of wood screws 3c and angular elements 8 having projecting portions 3d placed within the corresponding recesses formed in the elastic support element 3. The angular element 8 carries a tubular element 8a having a square cross-section and formed with a longitudinal slit at its upper side. The guide baffles 9 are mounted on the tubular member 8 by means of bolt arrangements 9a wherein the bolts are extended into the longitudinal slit of the square sectioned member 8.

The second end portion 1a of the enclosing angularly-shaped profile 1 is secured to the side wall of the vehicle by means of a clamping arrangement generally designated as 4. The clamping arrangement includes a first connecting member 4a which is formed as a web laterally extending from the side wall 5, and a second connecting member 4c. The first connecting member may be formed as a separated bar with a web extending toward the uppermost portion of the profile 1 or as an integral portion of an extrusion profile 5a which may be part of the side wall 5.

After the second end portion 1a has been inserted into a gap formed between the first connecting member 4a and the second connecting member 4c the assembled parts are fastened by screws 4b thus reliably securing the upper end portion of the profile 1 to the vehicle side wall 5. In case web 4a is a part of the extrusion profile 5a of the side wall 5, an insulating layer 6a is provided at a rear wall 6 of the air duct. A partially shown cover 7 is supported on the upper side of the first connecting member 4a.

As can be seen in the drawing, the upper portion of the second end portion 1a is inclined toward the floor 2 of the vehicle so that the direction of this inclination corresponds to the gap provided between the connecting member 4a and 4c in the clamping assembly 4. In accordance with the invention the line of the inclination of the end portion 1a is tangent to a circumference having a center point at the end of the end portion 1b. The purpose of this structure is that in dismantle of the clamping arrangement the screws 4b may be slightly released and the profile 1 will be pivoted relative to the center point located at the end of the end portion 1b in the direction from the gap between the connecting members 4a and 4c and thus released therefrom.

This pivoting movement is facilitated by provision of free space 3b provided between projecting lips 3a engaging the end of the portion 1b and holding this end during the pivoting movement of the profile 1. This pivoting movement of the profile 1 may be necessitated when an access to the innermost elements of the ventilation system is required.

It will be understood that each of the elements described above, or two or more together, may also find a useful application in other types of mounting arrangements differing from the types described above.

While the invention has been illustrated and described as embodied in a mounting arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A mounting arrangement for a ventilation or heating system for passenger vehicles having an air duct located in the interior of the vehicle, comprising an enclosure bounding said air duct, said enclosure including a profile of an angularly-shaped cross-section, said profile having a first end portion and a second end portion; support means for supporting said first end portion and secured to the floor of the vehicle and formed of an elastic material, said support means including a pair of projecting lips forming a free space therebetween, said first end portion having an end extended into said free space and engaged by said lips, said second end portion of said profile being inclined toward the floor at the vehicle with the line of inclination tangent to a circumference having a center point located at said end of said first end portion; and clamping means connected to a side wall of the vehicle and arranged to secure said second end portion of said profile, said clamping means including a gap to engage said second end portion, said gap being inclined in the direction corresponding to that of said second end portion to thereby facilitate dismounting of said profile by releasing said profile from said gap and pivoting said profile relative to said center point in the direction from said gap.

2. The arrangement of claim 1, wherein said elastic material is rubber.

3. The arrangement of claim 1, wherein said profile is formed of a sheet metal.

4. The arrangement of claim 1, wherein said profile is formed of a fiber reinforced synthetic material.

5. The arrangement of claim 1, wherein said clamping means include a first connecting element having a laterally extended web, and a second connecting element, said first connecting element is secured the side wall of the vehicle, and said web and said second connecting element in assembly forming said gap for said second end portion.

6. The arrangement of claim 5, wherein said web and said connecting element are secured to each other by a screw when said second end portion of said profile is inserted into said gap.

7. The arrangement of claim 6, wherein the side wall of the vehicle is formed with an extrusion profile and said web is a portion of said extrusion profile.

* * * * *